United States Patent [19]
Keil

[11] 3,984,347
[45] Oct. 5, 1976

[54] FOAM CONTROL COMPOSITION
[75] Inventor: Joseph W. Keil, Midland, Mich.
[73] Assignee: Dow Corning Corporation, Midland, Mich.
[22] Filed: Dec. 19, 1974
[21] Appl. No.: 534,246

[52] U.S. Cl................................. 252/321; 252/358
[51] Int. Cl.² ........................................ B01D 19/04
[58] Field of Search............................. 252/321, 358

[56] References Cited
UNITED STATES PATENTS

| | | | |
|---|---|---|---|
| 3,746,653 | 7/1973 | Churchfield ........................ | 252/321 |
| 3,763,021 | 10/1973 | Householder .................... | 252/358 X |
| 3,784,479 | 1/1974 | Keil ..................................... | 252/358 |

*Primary Examiner*—Benjamin R. Padgett
*Assistant Examiner*—David Leland
*Attorney, Agent, or Firm*—Jack E. Moermond

[57] ABSTRACT

A composition for controlling foam is disclosed which comprises (1) a base oil of polyoxypropylene polymers, polyoxypropylene-polyoxyethylene copolymers or siloxane glycol copolymers, (2) a foam control agent comprising a liquid polydimethylsiloxane, silica, and optionally a siloxane resin and (3) a siloxane copolymer dispersing agent.

10 Claims, No Drawings

FOAM CONTROL COMPOSITION

The use of various silicone containing compositions as antifoamers or defoamers is well known. However, the usefulness of any particular composition as a foam control agent is difficult at best to predict. Consequently compositions developed to control foams generally find use in specific applications and/or situations for which they have been developed. One of the major problems encountered in using foam control agents has been the inability to introduce the diluted foam control agent, which is relatively inexpensive, into the system which exhibits foaming problems because of their incompatibility with otherwise desirable diluents. To overcome this most manufacturers have developed water based emulsions of their silicone foam control agent even though the emulsification of the foam control agents detracts substantially from their effectiveness in controlling foam.

It has been found in accordance with this invention that the aforementioned problem can be alleviated with the composition of this invention which consists essentially of (1) a base oil or diluent, (2) a foam control agent, and (3) a dispersing agent.

The first component of the composition is a base oil which can be a polyoxypropylene polymer or a polyoxypropylene-polyoxyethylene copolymer. These polymers are commercially available from many sources and are characterized as polymers of $\{CH_2CH(CH_3)O\}$ units or such units copolymerized with $(CH_2Ch_2O)$ units. The polymers may be terminated with methyl, ethyl or propyl groups, for example, or they may be terminated with hydroxyl groups. The terminal groups are not known to be critical for the purposes of this invention. It is noted, however, that the commercially available products commonly are hydroxyl terminated and are referred to by those skilled in the art by the misnomers "polypropylene glycols" or "polypropylene-polyethylene glycols" regardless of whether they are monols, diols, triols or polyols. It has been found that such polymers having molecular weights in the range of 500 to 6000 are useful in the composition of this invention.

The base oil can also be a siloxane glycol copolymer having the general formulae (a) $R_aSi\{(OSiMe_2)_n(OSiMeG)_bOSiMe_2G\}_{4-a}$, (b) $R_aSi\{(OSiMe_2)_n(OSiMeG)_cOSiMe_3\}_{4-a}$, (c) $GMe_2Si(OSiMe_2)_n(OSiMeG)_bOSiMe_2G$, and (d) $Me_3Si(OSiMe_2)_n(OSiMeG)_cOSiMe_3$ in which formulae R is a hydrocarbon radical free of aliphatic unsaturation and contains from 1 to 10 carbon atoms Me is a methyl radical, G is a radical of the structure $-D(OR')_mA$ wherein D is an alkylene radical containing from 1 to 30 carbon atoms, R' is an alkylene radical containing from 2 to 10 carbon atoms, $m$ has a value of at least 1, and A is a capping group, $a$ has a value of 0 or 1, $n$ has a value of at least 1, $b$ has a value of 0 to 50, and $c$ has a value of 1 to 50.

In the above formulae R can be any hydrocarbon radical free of aliphatic unsaturation which contains from 1 to 10 carbon atoms such as a methyl, ethyl, propyl, isopropyl, butyl, hexyl, decyl, phenyl, tolyl, benzyl, xylyl, methylcyclohexyl, cyclohexyl, cyclopentyl, β-phenylpropyl or a β-phenylethyl radical.

Specific examples of alkylene radical D which links the glycol portion of G to the silicon atom are the methylene, ethylene, propylene, isopropylene, butylene, octylene, decylene, octadecylene and the myricylene radicals. Preferably D contains from 1 to 16 carbon atoms.

R' in the above formula is any alkylene radical containing from 2 to 10 carbon atoms. Thus R' can be an ethylene, propylene, isopropylene, butylene, hexylene, octylene or a decylene radical. Most preferably R' contains from 2 to 4 carbon atoms. It is noted that R' can be derived from a single glycol or a combination of glycols. That is to say, for example, OR' can be ethylene oxide units, propylene oxide units or butylene oxide units only, or OR' can be combinations of such units.

The symbol $m$ which defines the number of OR' units in the glycol portion of the molecule can have a value as low as 1 and can range up to 1000 or more. Generally, $m$ will have an average value in the range of 10 to 100.

The glycol or polyoxyalkylene unit is terminated or capped by the A group. The specific nature of this group is not known to be critical for purposes of this invention. Thus the glycol can be capped by a hydroxyl group (A is a hydrogen atom), by an ether group (A is a monovalent hydrocarbon radical such as a methyl, butyl, vinyl or phenyl radical), by a carboxyl radical, by the sale or ester or a carboxyl radical, by a carbonate ester group, or by an isocyanate group.

The symbol $n$ which defines the number of dimethylsiloxane units in the molecules can have a value of at least 1 and can range up to 1500 or more. It is believed that the number of dimethylsiloxane units in the molecule in relationship to the glycol containing G units should be at least 10:1 for the most satisfactory results to be obtained. The upper ratio of $OSiMe_2$ units to G containing units can be 50:1 or more.

The siloxane glycol copolymers useful as base oils herein are well known commercially available materials. For those unfamiliar with these compounds attention is directed to U.S. Pat. Nos. 3,402,192; 3,518,288; and 3,637,783 for illustrative descriptions of their preparations and other details. The entire disclosures of the foregoing patents are incorporated herein by reference.

The base oil can constitute from 50 to 98.9 percent by weight of the composition. The base oil can be made up of a polyoxypropylene polymer per se, a polyoxypropylene-polyoxyethylene copolymer per se, a siloxane glycol copolymer per se, or a mixture of any of these. The particular base oil used will depend on the particular nature of the system in which it is desired to control the foam.

The second component of the composition is the foam control agent. This agent can constitute from 1 to 40 percent by weight of the composition. The foam control agent consists essentially of from 88 to 95 parts by weight of a liquid polydimethylsiloxane having a viscosity of at least 20 centistokes at 25°C., from 5 to 10 parts by weight of silica, and from 0 to 2 parts by weight of a siloxane resin composed of $(CH_3)_3SiO_{1/2}$ units and $SiO_2$ units in which resin the ratio of $(CH_3)_3SiO_{1/2}$ units to the $SiO_2$ units is within the range of from 0.4:1 to 1.2:1.

The liquid polydimethylsiloxanes are well known articles of commerce available from numerous sources. They can be prepared by various techniques such as the hydrolysis and subsequent condensation of dimethyldihalosilanes, or by the cracking and subsequent condensation of dimethylcyclosilanes. The particular endblocking groups on the polydimethylsiloxane is not critical. Generally speaking, the commercially available materials are trimethylsilyl or hydroxyl endblocked, but other endblocked materials would work equally well. To obtain significant antifoam or defoam performance the viscosity of the polydimethylsiloxane must be at least 20 centistokes at 25°C. The upper viscosity limit of this component is not critical and can range up to 1,000,000 centistokes or more. Best results are believed to be obtained when the viscosity of the polydimethylsiloxane is in the range of 20 to 2000 centistokes at 25°C.

The siloxane resin employed in the composition is also a standard article of commerce available from various sources. It can be prepared by the cohydrolysis and condensation of (CH$_3$)$_3$SiCl and SiCl$_4$ or by reacting (CH$_3$)$_3$SiCl with an acidic silica sol. Its preparation is detailed in a host of places in the literature and therefore, will not be set forth again here. While the presence of the siloxane resin in the foam control agent is not required, for many applications it enhances the overall performance of the product.

A silica aerogel is one kind of silica to employ in the composition. Briefly, such materials are prepared by displacing water from a silica hydrogel with a low boiling organic liquid such as ethyl alcohol, heating the treated gel in an autoclave to approximately the critical temperature of the organic liquid, and then releasing the vapors of the organic liquid from the autoclave whereby excessive shrinking or crushing of the cellular structure of the silica is avoided. The details of this technique are described in the literature and silica aerogels are commercially available. Other silicas such as precipitated silicas, silica xerogels, fume silicas, and treated silicas which have organosilyl groups on their surface can also be employed. These and other silicas which can be employed herein are well known and will be obvious to those skilled in the art.

The third essential component of the composition of this invention is characterized as a "dispersing agent" for want of a better term. The function of this component is to keep the foam control agent (2) dispersed in base oil (1). Two types of siloxane copolymers have been found which will serve this purpose.

One silicone dispersing agent useful in this invention is a polydimethylsiloxane-organic copolymer in which the polydimethylsiloxane portion has a molecular weight of at least 2000 and the organic portion consists essentially of a polyoxypropylene polymer having a molecular weight of at least 800 or a polyoxyethylene-polyoxypropylene copolymer having a molecular weight of at least 1500, said organic portion being attached to silicon atoms via silicon-carbon bonds.

The other silicone dispersing agent useful herein is a siloxane-organic copolymer which is the reaction product produced by heating a mixture of a polydimethylsiloxane containing silicon bonded hydrogen atoms having a molecular weight of at least 1500 and a hydroxylated polyoxypropylene having a molecular weight of at least 800 or a hydroxylated polyoxyethylene-polyoxypropylene copolymer having a molecular weight of at least 1500. It is believed that these dispersing agents differ from those described immediately above only in that the polyoxyalkylene portion is attached to the silicon atom via a silicone to oxygen to carbon bond instead of a direct silicon to carbon bond. It is theorized that the reaction upon heating (for about two hours at reflux) takes place between the silicon bonded hydrogen atoms in the siloxane and the hydroxyl groups in the polyoxyalkylene. Formation of the reaction product is facilitated by the use of a catalyst known to promote the SiH-carbinol condensation reaction, examples of such catalysts being chloroplatinic acid and metal salts such as stannous octoate.

The composition of this invention is prepared by simply mixing the three components together in the correct proportions. So far as is known at this time there is no particular order in which the components should or need be mixed.

The amount of the composition of this invention which is employed will depend on the particular system in which foam is to be controlled and the extent to which the user wishes to control the foam. Thus the amounts will vary depending on whether one is using the composition in an alkaline soap solution, evaporation of alkaline paper, black liquor, concentration of synthetic rubber latices, steam distillation of styrene-butadiene emulsions, refining sugar, dyeing textiles, treating sewage for disposal, or something else. The compositions of this invention can be used as any kind of foam control agents, i.e., as defoaming agents and/or antifoaming agents. Defoaming agents are generally considered as foam reducers whereas antifoaming agents are generally considered as foam preventors. As noted, the instant compositions can serve in either or both capacities.

Now in order that those skilled in the art may better understand how the present invention can be practiced, the following examples are given by way of illustration and not by way of limitation. All parts and percents referred to herein are by weight, and all viscosities measured at 25°C., unless otherwise specified.

EXAMPLE 1

A mixture consisting of 25g. of a siloxane of the general formula (CH$_3$)$_3$SiO[(CH$_3$)$_2$SiO]$_{~64}$[(CH$_3$)HSiO]$_{~6}$—Si(CH$_3$)$_3$, 100g. of a carbinol ended polypropylene glycol homopolymer mono-ol having a molecular weight of about 4100 (Ucon LB 1715), 125g. of xylene, and 10 drops of a 1 molar isopropanol solution of H$_2$PtCl$_6$·6H$_2$O was refluxed for 1 hour under nitrogen. Then 20g. of n-butyl alcohol was added and refluxing continued for 2 more hours. The product was then filtered and the xylene stripped off to obtain a polydimethylsiloxane-organic copolymer of the general formula

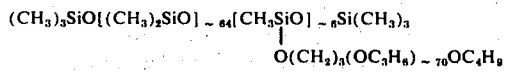

EXAMPLE 2

A mixture consisting of 25g. of a siloxane of the general formula (CH$_3$)$_3$SiO[(CH$_3$)$_2$SiO]$_{64}$[(CH$_3$)HSiO]$_{6}$—Si(CH$_3$)$_3$, 100g. of an allyl ended polyoxyethylene-polyoxypropylene copolymer (about a 1:1 mole ratio) mono-ol having a molecular weight of about 6000, 125g. of xylene, and 20 drops of a 1 molar isopropanol solution of H$_2$PtCl$_6$·6H$_2$O was refluxed for 30 minutes under nitrogen. The product was then filtered and the xylene stripped off to obtain a polydimethylsiloxane-organic copolymer of the general formula

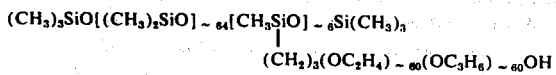

$(CH_3)_3SiO[(CH_3)_2SiO]_{84}[CH_3SiO]_6Si(CH_3)_3$
                                          |
                                          $(CH_2)_3(OC_2H_4)_{60}(OC_3H_6)_{60}OH$

EXAMPLE 3

Four antifoam emulsions were prepared for evaluation. Emulsion A consisted essentially of (1) 26g. (52%) of a base oil which was a polypropylene glycol homopolymer mono-ol having a molecular weight of about 4100 (Ucon LB 1715), (2) 20g. (40%) of a commercial antifoam composition consisting essentially of about 88 parts of a 1000 cs. trimethylsilyl endblocked polydimethylsiloxane fluid, about 10 parts of silica, and about 2 parts of a 75% solids solution in xylene of a siloxane resin composed of $(CH_3)_3SiO_{1/2}$ units and $SiO_2$ units in which the ratio of $(CH_3)_3SiO_{1/2}$ units to the $SiO_2$ units is within the range of 0.4:1 to 1.2:1, and (3) 4g. (8%) of the polydimethylsiloxane-organic copolymer dispersing agent of Example 1.

Emulsion B was prepared for purposes of comparison and consisted essentially of (1) 30g. (60%) of the base oil used in Emulsion A, and (2) 20g. (40%) of the commercial antifoam composition used in Emulsion A.

Emulsion C consisted essentially of (1) 64g. (64%) of a base oil which was a polyoxyethylene-polyoxypropylene copolymer (about a 1:1 mole ratio) mono-ol having a molecular weight of about 6000 (Ucon 50 HB 5100), (2) a mixture consisting of 20g. (20%) of the commercial antifoam composition used in Emulsion A plus 10g. (10%) of a 50 cs. trimethylsilyl endblocked polydimethylsiloxane fluid, and (3) 6g. (6%) of the polydimethylsiloxane-organic copolymer dispersing agent of Example 2.

Emulsion D was prepared for purposes of comparison and consisted essentially of (1) 70g. (70%) of the base oil used in Emulsion C, and (2) a mixture consisting of 20g. (20%) of the commercial antifoam composition used in Emulsion A plus 10g. (10%) of the 50 cs. siloxane fluid used in Emulsion C.

Antifoam emulsions A and B above were evaluated in an antifoam pump test. This test makes use of a motor driven pump (Eastern Industries Model B-1: style CZZ-71-ZV) which continually recirculates the foaming system. The foaming system is pumped into a stainless steel cylinder 7 inches high with a 5 inch diameter (2000 ml. capacity) where foam height is measured. The antifoam is subjected to high amounts of agitation, emulsification, and shear in the test apparatus. In this test 1000 ml. of a 1% Triton X-100 (isooctyl phenyl polyethoxy ethanol) solution in water at room temperature is placed in the pump test vessel. Lines are marked on the inside of the cylinder at levels of 1, 2 and 3 inches above the surface of the liquid. A number of drops of the composition being evaluated is added to the surfactant solution in the pump tester. The pump is then turned on and the time (in seconds) noted for the foam to reach the 1, 2 and 3 inch levels marked on the cylinder. The three times are then totaled to obtain a single value. The results of the evaluation are set forth in the table below. 250 ppm of antifoam were used in this test.

| Emulsion | Time (sec.) to reach foam height of | | | |
|---|---|---|---|---|
| | 1 in. | 2 in. | 3 in. | Total (sec.) |
| A | 3 | 95 | 170 | 268 |
| B* | 3 | 95 | 130 | 228 |

*Included for comparison

Samples of antifoam emulsions A and B were placed in vials so that a 3 inch column of the emulsion was obtained. These vials were then heated for 18 hours at 100°C. to test the emulsion for stability. This heating causes acceleration of any separation of the antifoam components that may occur. Then a sample from the top of the 3 inch column was evaluated in the antifoam pump test in the same manner as described above. The test results are set forth in the table below.

| Emulsion | Time (sec.) to reach foam height of | | | |
|---|---|---|---|---|
| | 1 in. | 2 in. | 3 in. | Total (sec.) |
| A | 3 | 100 | 158 | 261 |
| B* | 3 | 45 | 105 | 153 |

*Included for comparison

Antifoam emulsions C and D above were evaluated in the antifoam pump test described above with the following modifications. A 0.1% Tween 80 (polyoxyethylene sorbitan monooleate) solution was substituted for the Triton X-100 solution, a heating mantel was placed at the bottom of the cylinder to control the temperature, the antifoam compositions were diluted to 10% solids with cold water for evaluation, the surfactant solution was heated in the pump test vessel to 65°C. before the antifoam composition was added, and then heated to 90°C. before turning the pump on. In this test antifoam emulsion C gave a foam height of <1⅞ inch after 4 minutes. Antifoam emulsion D (included for comparison) oiled out when the 10% dilution was prepared making it impossible to test and showing it was an unstable dispersion. Also for purposes of comparison the base oil per se (Ucon 50 HB 5100) used in emulsions C and D was evaluated in this test and gave a foam height of 1 inch in 1 minute.

That which is claimed is:
1. A composition which consists essentially of
   1. 50 to 98.9 percent by weight of a base oil selected from the group consisting of polyoxypropylene polymers and polyoxypropylene-polyoxyethylene copolymers having molecular weights in the range of 500 to 6000, and siloxane glycol copolymers having the general formulae (a) $\{R_aSi\ (OSiMe_2)_n(OSiMeG)_bOSiMe_2G\}_{4-a}$, (b) $\{R_aSi\ (OSiMe_2)_n(OSiMeG)_cOSiMe_3\}_{4-a}$, (c) $GMe_2Si(OSiMe_2)_n(OSiMeG)_bOSiMe_2G$, and (d) $Me_3Si(OSiMe_2)_n(OSiMeG)_cOSiMe_3$ in which formulae
   R is a hydrocarbon radical free of aliphatic unsaturation and contains from 1 to 10 carbon atoms,
   Me is a methyl radical,
   G is a radical of the structure $—D(OR')_mA$ wherein
   D is an alkylene radical containing from 1 to 30 carbon atoms, R' is an alkylene radical containing from 2 to 10 carbon atoms, m has a value of at least 1, and A is a capping group, a has a value of 0 or 1, n has a value of at least 12, b has a value of 0 to 50, and c has a value of 1 to 50, 2. 1 to 40 percent by weight of a foam control agent which consists essentially of 88 to 95 parts by weight of a liquid polydimethylsiloxane having a viscosity of at least 20 centistokes at 25°C., 5 to 10 parts by weight of silica, and 0 to 2 parts by weight of a siloxane resin consisting essentially of $SiO_2$ units and $(CH_3)_3SiO_{1/2}$ units the ratio of the $SiO_2$ units to the $(CH_3)_3SiO_{1/2}$ units being in the range of 1:0.4 to 1:1.2, and 3. 0.1 to 10 percent by weight of a dispersing agent which maintains (2) dispersed in (1) and which is a siloxane copolymer selected from the group consisting of i. polydimethylsiloxane-organic copolymers in which the polydimethylsiloxane portion has a molecular weight of at least 2000 and the organic portion consists essentially of a polyoxypropylene polymer having a molecular weight of at least 800 or a polyoxyethylene-polyoxypropylene copolymer having a molecular weight of at least 1500, said organic portion being attached to silicon atoms via silicon-carbon bonds, and ii. polydimethylsiloxane-organic copolymers which are the reaction products produced by heating a mixture of a polydimethylsiloxane containing silicon bonded hydrogen atoms having a molecular weight of at least 1500 and a hydroxylated polyoxypropylene having a molecular weight of at least 800 or a hydroxylated polyoxyethylene-polyoxypropylene copolymer having a molecular weight of at least 1500.

2. A composition as defined in claim 1 wherein (1) is a polyoxypropylene polymer, in (2) the liquid polydimethylsiloxane has a viscosity in the range of 20 to 2000 centistokes, and (3) is a reaction product (ii).

3. A composition as defined in claim 1 wherein (1) is a mixture of a polyoxypropylene polymer and a siloxane glycol copolymer (d), in (2) the liquid polydimethylsiloxane has a viscosity in the range of 20 to 2000 centistokes, and (3) is a reaction product (ii).

4. A composition as defined in claim 3 wherein the siloxane glycol copolymer (d) has the general formula $MeSi(OSiMe_2)_{-75}(OSiMeG)_{-7}OSiMe_3$ wherein G is $-(CH_2)_3(OC_2H_4)_{-24}(OC_3H_6)_{-24}OOCCH_3$.

5. In a process of controlling foam which includes the addition of a foam control agent to the system in which the foaming is to be controlled, the improvement comprising using the composition of claim 1 as the foam control agent.

6. In a process of controlling foam which includes the addition of a foam control agent to the system in which the foaming is to be controlled, the improvement comprising using the composition of claim 3 as the foam control agent.

7. A composition as defined in claim 1 wherein (1) is a polyoxypropylene polymer, in (2) the liquid polydimethylsiloxane has a viscosity in the range of 20 to 2000 centistokes, and (3) is a reaction product (i).

8. A composition as defined in claim 1 wherein (1) is a mixture of a polyoxypropylene polymer and a siloxane glycol copolymer (d), in (2) the liquid polydimethylsiloxane has a viscosity in the range of 20 to 2000 centistokes, and (3) is a reaction product (i).

9. A composition as defined in claim 8 wherein the siloxane glycol copolymer (d) has the general formula $MeSi(OSiMe_2)_{-75}(OSiMeG)_{-7}OSiMe_3$ wherein G is $-(CH_2)_3(OC_2H_4)_{-24}(OC_3H_6)_{-24}OOCCH_3$.

10. In a process of controlling foam which includes the addition of a foam control agent to the system in which the foaming is to be controlled, the improvement comprising using the composition of claim 7 as the foam control agent.

* * * * *

UNITED STATES PATENT AND TRADEMARK OFFICE
CERTIFICATE OF CORRECTION

PATENT NO. : 3,984,347
DATED : October 5, 1976
INVENTOR(S) : Joseph W. Keil

It is certified that error appears in the above—identified patent and that said Letters Patent are hereby corrected as shown below:

Column 6, line 54, the portion of the formula which reads
"(a) $\{R_a Si(OSiMe_2)_n$" should read --(a) $R_a Si\{(OSiMe_2)_n$--.

Column 6, line 56, the portion of the formula which reads
"(b) $\{R_a Si(OSiMe_2)_n$" should read --(b) $R_a Si\{(OSiMe_2)_n$--.

Column 8, line 28, the word "polyoxyropylene" should read --polyoxypropylene--.

Column 7, line 6, the number "12" should read --1--.

Signed and Sealed this

Twenty-sixth Day of February 1980

[SEAL]

Attest:

SIDNEY A. DIAMOND

Attesting Officer

Commissioner of Patents and Trademarks